(12) United States Patent
Ishihara

(10) Patent No.: US 6,412,983 B1
(45) Date of Patent: Jul. 2, 2002

(54) LINEAR MOTION GUIDE UNITS

(75) Inventor: Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 26 days.

(21) Appl. No.: 09/665,671

(22) Filed: Sep. 20, 2000

(30) Foreign Application Priority Data

Oct. 20, 1999 (JP) .............................. 11-298555

(51) Int. Cl.$^7$ .............................................. F16C 29/06
(52) U.S. Cl. .......................................................... 384/45
(58) Field of Search ......................... 384/45, 44, 43; 464/168

(56) References Cited

U.S. PATENT DOCUMENTS 5,927,858 A * 7/1999 Agari ........................... 384/45

FOREIGN PATENT DOCUMENTS

| JP | 10286/1976 | 3/1976 |
|---|---|---|
| JP | 126148/1993 | 5/1993 |
| JP | 281154/1998 | 10/1998 |

OTHER PUBLICATIONS

US 2001/0012415 A1, Kasuga et al., Aug. 9, 2001.*

* cited by examiner

Primary Examiner—Lenard A. Footland
(74) Attorney, Agent, or Firm—Browdy and Neimark

(57) ABSTRACT

In a linear motion guide unit in which separators are arranged between any adjacent rolling elements, or balls, running through recirculating passages, the separators are each formed for elastic deformation to well compensate the recirculating passages for variance in length. Each separator is comprised of a major body and elastic supports positioned at desired intervals around the major body. The elastic supports are each composed of an elastically deformable leg extending radially outwardly of the major body and a seat formed integrally with the deformable leg. When the force rendering the adjacent balls near each other is small, the separator comes into contact with the associated ball at only the outermost end of the seat. In contrast, with the increase of load exerted on the balls to make them near each other, the seat makes displacement to its retreated position by virtue of the elastic deformation of the leg, so that the area where the separator makes contact with its associated ball reaches an annular peripheral area the major body.

12 Claims, 4 Drawing Sheets

LINEAR MOTION GUIDE UNITS

BACKGROUND OF THE INVENTION

1. Field of the Invention

The present invention relates to a linear motion guide unit in which a slider is movable on an elongated track rail by virtue of rolling elements running through recirculating passages where separating elements are each arranged between any adjacent rolling elements to keep the rolling elements against coming in engagement with each other.

2. Description of the Prior Art

In most linear motion guide units, the rolling elements run through the recirculating passages in the slider to allow the slider to move on the track rail. Nevertheless, any adjacent rolling elements can sometimes come into contact with each other when they run through the load areas provided between the track rail and the slider. Especially, the rolling elements in the linear motion guide units, as having neared each other, can sometimes come into contact or engagement with each other because a distance of the centers of adjacent rolling elements changes subtly owing to the eccentricity of each rolling element, the skew and deformation of the track rail, which might arise from external loads applied unevenly. As the rolling elements turn in the same direction, the contact forces at contact areas on one rolling element are opposite the contact forces on the other. Thus, the frictional forces arising from the contact or engagement of the adjacent rolling elements results in impeding the smooth running of the rolling elements. During sliding motion of the slider on the track rail, the rolling elements in the recirculating passages are subjected to the repeated collisions against one another as well as the raceways, and moreover the rolling is substituted frequently for sliding motion. This causes noise or vibration considerably high in frequency and consequently premature wear of the rolling elements as well as the recirculating passages, thus reducing the operating accuracy and the acceptable service life of the linear motion guide unit.

A linear motion guide unit has been conventionally proposed, in which separators are each arranged between any two adjacent rolling elements to keep the rolling elements from coming into direct contact with each other in the recirculating passages. Referring to FIG. 10, there is shown an example of the prior separators. A separator 50 in FIG. 10 is made in a substantially cylindrical form and provided in axially opposite faces thereof with semi-spherical concavities 51, which are arranged in symmetry to each accommodate a part of the sphere of any rolling element 20. Any separator 50 has to be accepted commonly to isolate any two adjacent rolling elements 20 apart from each other, so that an axial distance between the centers of the semi-spherical concavities 51 is preselected to a fixed thickness t.

When the slider moves on the track rail, the rolling elements run through the recirculating passages, which are composed of non-loaded areas formed in the slider and load areas provided between first raceway grooves on the track rail and second raceway grooves on the slider. Most recirculating passages usually show some variance in length. Thus, when each of the separators 50 shown in FIG. 5 is in turn interposed between any two adjacent rolling elements or balls 20, the last separator can be sometimes interposed either too tightly or too loosely. Nevertheless, it is very tough to make the recirculating passage match in length with a circular string of the combined rolling elements and separators. Any separator cramped tightly can afford no play to the associated adjacent rolling elements, thereby increasing remarkably the sliding friction applied to the slider. To cope with this, it may be propose to prepare other types of the separators for the last separator, which are different in thickness t from the major separators to compensate for the variance in length of the recirculating passage. However, this needs to reserve many types of the separators differing in their axial thickness, resulting in disadvantages of complicated production and management of parts or components, which might cause the increase of production cost of the linear motion guide unit.

With the use of the separators having a fixed axial thickness, the rolling elements can sometimes dent the track rail with pitches nearly equal to that of the rolling elements. Thus, the slider can get scratched thereby resulting in causing noise, unacceptable vibration and badly premature wear. To deal with the disadvantage mentioned just above, a linear motion guide unit is disclosed in, for example, Japanese Patent Laid-Open No. 281154/1998, in which the separators to be interposed between any two adjacent rolling elements are made varied each other in their axial thickness to render unlike the pitches of the dents that might arise on the track rail, thereby to help ensure the slider moves smoothly with less noise. With this prior linear motion guide unit, many types of the separators, which are varied individually in axial thickness, are prepared previously and any desired type of the separator is selected depending on the interval between the adjacent rolling elements.

In another linear motion guide unit disclosed in Japanese Patent Laid-Open No. 126148/1993, in which the separators are also interposed between any two adjacent rolling elements, two types of separators are employed; many separators of a fixed axial thickness, and at least one of another type composed of halves adjustable relatively in position to make easy the production and assemblage of the linear motion guide unit. The separators are made less in size than the rolling elements and, therefore, the halves come to be produced in further small in size.

Japanese Utility Model Publication No. 10286/1976, moreover, discloses a ball bearing with separators, in which the separators interposed between the adjacent steel balls are each made with semi-spherical concavities that are less in the radius of curvature than the steel balls. In addition, the separators are elastic and also made with annular groove extending around the radially outer periphery thereof, thereby to allow freely adjusting the interval between any two adjacent balls.

Although but it may be considered to make the overall separator elastic, such separator is easily subjected to much deformation dependently on the force occurring between the adjacent rolling elements, so that the control of the interval between the adjacent balls becomes very complex. As will be seen from the above discussions, it may be worthwhile considering a recirculating-ball linear motion guide unit in which a separator is partly made ready to undergo elastic deformation so that the separator may not only absorb most variations in an interval between any two adjacent rolling elements with the deformation occurring in its elastic parts so far as the interval between the adjacent rolling elements remains within a preselected value, but also keep the interval between the adjacent rolling elements from becoming less than a preselected critical value, thereby making it possible to compensate for the variances in length of recirculating passages with the separator.

SUMMARY OF THE INVENTION

The present invention, therefore, has as its primary object to overcome the major problem in the prior linear motion guide unit where it is very tough to make a recirculating passage agree in length with a recirculating-ball string composed of rolling elements and separators disposed between any two adjacent rolling elements. More particular, it relates to a linear motion guide unit in which a separator is partly made ready to undergo elastic deformation so as to compensate for the variance in length of recirculating passage with the elastic performance, thereby making assembly operation easy and helping ensure smooth sliding motion with low noise.

The present invention is concerned with a linear motion guide unit comprising; a track rail having first raceway grooves on lengthwise side surfaces thereof; a slider riding astride on the track rail for movement in a sliding manner along and with respect to the track rail, the slider being made with second raceway grooves confronting the raceway grooves of the track rail; recirculating passages composed of load areas defined between the confronting first and second raceway grooves, and non-loaded areas formed in the slider to communicate with the load areas; rolling elements running through the recirculating passages; and separators disposed between any two adjacent rolling elements to move together with the rolling elements through the recirculating passages; wherein at least one of the separators is comprised of a major body allowing a minimum interval for the two adjacent rolling elements, and elastic supports arranged radially extended around the major body to keep the adjacent rolling elements apart away each other with a distance larger than the minimum interval.

With the linear motion guide unit constructed as described just above, when the force exerted on the adjacent rolling elements increases to make them even nearer each other, the separator is much subjected to elastic deformation to come into supporting the associated rolling elements at its major body, thereby keeping the adjacent rolling elements apart away each other with the allowable minimum interval. In contrast, as the force influencing the rolling elements to near each other becomes less, the elastic supports of the separator are restored by virtue of their own elasticity to their home position where the adjacent rolling elements are kept apart away each other with a distance larger than the minimum interval. Thus, it will be preferred that at least one of the prior separators in the recirculating passage is replaced with the separator of the present invention to automatically adjust the interval between any two adjacent rolling elements on the basis of the elasticity of the elastic supports, depending on the force exerted on the rolling elements.

In accordance with one aspect of the present invention, a linear motion guide unit is disclosed wherein the major body of the separator is of a cylindrical solid smaller in diameter than the rolling element and having axially opposing end faces confronting the adjacent rolling elements, the end faces being each made concaved with a radius of curvature, which is somewhat less than a radius of the rolling element. When the adjacent rolling elements have closed with the separator disposed between them, the separator supports the rolling elements with making contact with them, not throughout the concaved surfaces thereof but only at the annular peripheral areas of the concaved surfaces. Moreover, spaces left between the separator and the adjacent rolling elements may serve to accommodate therein lubricant. Thus, the separator may simply turn into either one of a supporting situation where it makes contact with the rolling elements at the areas reaching the annular peripheral areas around the concaved surfaces or another supporting situation where it comes into elastic contact with the rolling elements at only the elastic supports, depending on the contact pressure due to the rolling elements.

In accordance with another aspect of the present invention, a linear motion guide unit is disclosed wherein the elastic supports of the separator are each composed an elastically deformable leg connected to an outer periphery of the major body, and a seat attached to a radial distal end of the deformable leg to come into abutment against any one of the adjacent rolling elements under elastic influence of the deformable leg. The elastic force to make the seats urge the adjacent rolling elements apart away from each other is due to the elastic function of the elastically deformable legs arranged around the major body of the separator.

In accordance with another aspect of the present invention, a linear motion guide unit is disclosed wherein the seats on the elastic supports are each made with a concaved surface that is identical with the concaved end face of the major body in the radius of curvature. Moreover, the concaved surface of the seat is made coincident with a phantom curved elongation of the concaved end face of the major body when the associated deformable leg is free from any stress, thus recovering from their deformation. The elastic supports of the separator are each made with a curved surface equal in the radius of curvature with the concaved end face on the major body, which is somewhat less in the radius than the rolling element. The concaved surface on the elastic support is designed coincident with a phantom curved elongation of the concaved end face of the major body when the associated deformable leg is free from deformation. Thus, the rolling elements having made contact with the elastic supports approach each other whilst deforming the elastically deformable leg, till they come into contact with the annular peripheral areas of the concaved end faces on the major body, at which the rolling elements are kept apart away from one another with the minimum interval.

In accordance with a further another aspect of the present invention, a linear motion guide unit is disclosed wherein the elastically deformable legs are each made of a portion slim in thickness, which connects the associated seat to the periphery of the major body. The construction in which the leg is made slim in thickness provides the elastically deformable portion that may be easily subjected to elastic deformation with a bending force, to thereby allow the seat of the elastic support shifting with respect to the major body, thus resulting in moving relatively of the rolling element.

In accordance with another aspect of the present invention, a linear motion guide unit is disclosed wherein the elastic supports of the separator are positioned at desired intervals around peripheries of the axially opposing end faces of the major body, the end faces confronting the adjacent rolling elements. The elastic supports intermittent around the major body of separator are much flexible to deflect toward and away from the rolling element by virtue of the elastic deformation of the deformable legs, compared with the construction in which the elastic supports are formed continually throughout around the separator.

In accordance with another aspect of the present invention, a linear motion guide unit is disclosed wherein the elastic supports on the side facing any one of the two adjacent rolling elements are arranged offset circumferentially of the major body with respect to other elastic supports on the side facing another of the adjacent rolling elements. The construction in which the elastic supports confronting any one of the adjacent rolling elements are offset circumferentially of the major body relatively of the elastic supports on the side of another of the adjacent rolling elements allows the deformable legs to deflect or deform elastically with no mutual interference.

In accordance with a further another aspect of the present invention, a linear motion guide unit is disclosed wherein the elastic supports of the separator are each reinforced with a rib formed integrally with the major body. Although the elastic supports are subjected to repeated stress due to the rolling elements, the reinforcing ribs serve for protecting the elastically deformable legs from their premature deterioration, thus helping ensure the long-lasting separator.

According to the present invention, only one, two or more separator disposed between any two adjacent rolling elements in the recirculating passage may be sufficient to make the linear motion guide unit easy to assemble, because the separator of the present invention is formed in the construction easy to undergo the elastic deformation. In addition, at least one separator existing in the recirculating passage may be necessary to making it possible to compensate for the minute changes in interval between any two adjacent rolling elements to ensure the smooth movement of the slider in the common applications of the linear motion guide units.

For example, the separators each comprised of the major body and the elastic supports may be disposed everywhere between any adjacent rolling elements in the recirculating passage. In this case, the changes in the intervals between any two adjacent rolling elements can be compensated at every separator so that the slider is allowed to move far smoothly. As an alternative, the separators each comprised of the major body and the elastic supports may be disposed between the two adjacent rolling elements at only two locations, each to each location, where the recirculating passage is divided into just two halves.

In accordance with another aspect of the present invention, there is provided a linear motion guide unit in which the slider is comprised of a casing and end caps attached to lengthwise opposing ends of the casing, each to each end, the casing being made with the second raceway grooves and also having therein return passages to provide a part of non-loaded areas where the rolling elements is less subjected to load, and the end caps being made therein with turnarounds to provide other part of the non-loaded areas, communicating the load areas with the return passages to allow the rolling elements turning round in a recirculating manner.

With the linear motion guide unit constructed as described just above, the elastic supports of the separator are allowed to undergo easily the elastic deflection by virtue of the elasticity of the deformable legs. Moreover, the separator consisting of the major body and the elastic supports integral with the major body is easy in production. According to the separator of the present invention, the elastic supports to be abutted against the adjacent rolling elements are arranged at desired intervals around the periphery of the major body, with any elastic supports on the side of any one of the adjacent rolling elements being positioned offset circumferentially of the major body with respect to other elastic supports on another of the rolling elements. This construction allows the elastic supports making elastic deflection or deformation with no mutual interference.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Referring now in detail to the drawings, the linear motion guide unit provided with the separators according to the present invention will be explained below.

Figure 1:
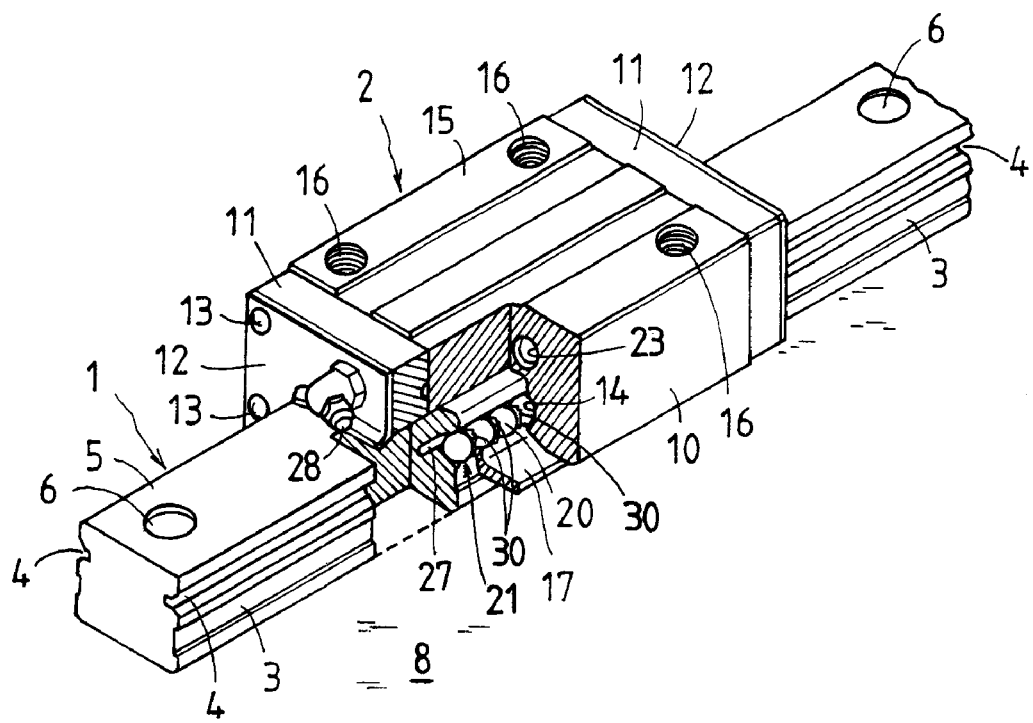
FIG. 1 is a perspective view, partially broken away, showing a preferred embodiment of a linear motion guide unit according to the present invention.

First referring to FIG. 1, a linear motion guide unit embodying the present invention is comprised of a track rail 1, and a slider 2 riding astride the track rail 1 for linear movement along the track rail 1 by virtue of rolling elements, or balls 20, which run through first raceway grooves 4 formed on side wise-opposed lengthwise-extended surfaces 3 of the track rail 1. The track rail 1 has holes 6 opening on to a top surface 5 thereof at locations spaced lengthwise from each other. The track rail 1 may be fixed together with any mounting base 8, such as a bed, machine base, work table and so on, by screwing bolts through the holes 6 of the track rail 1 into mating openings in the mounting base 8. The slider 2 has a casing 10 movable relatively to the track rail 1, and end caps 11 secured to the opposing ends of the casing 10. Provided on the upper surface 15 of the casing 10 are openings 16 for mounting the slider 1 to other appliances, parts, chucks, grasping jaws or the like.

Both of the casing 10 and the end caps 11 are made on the lower surfaces thereof with recess, which extends fore-and-aft in the slider 2 so as to ride astride the track rail 1 for free movement. Formed on widthwise opposing walls defining the fore-and-aft recess are second raceway grooves 14, which are each extended confronting the first raceway grooves 4 on the track rail 1 to define load raceways 21 where the balls 20 are arranged for rolling motion. Moreover, retainer bands 27 are provided in the casing 10 so as to hold the balls 20 to thereby prevent the balls 20 from falling out of the casing 10. Bottom seals 17 are secured to the lower surfaces of the slider 2 to close clearances between the track rail 1 and the slider 2.

Mounted on the end caps 11 are end seals 12 for keeping sealing function between the track rail 1 and the lengthwise opposing ends of slider 1. The casing 10 is also provided at the lengthwise opposing ends thereof with threaded openings 13 for screws by which the end caps 11 and end seals 12 are secured to the casing 10. Most linear motion guide units use commonly lubricant such as grease or lubricating oil. With grease used, it is applied through a grease nipple 28 to the rolling balls 20 at, for example, turnarounds in the recirculating passages, which will be described below. In contrast, lubricating oil is supplied through any pipe joint, which are used substituting for the grease nipple.

Figure 2:
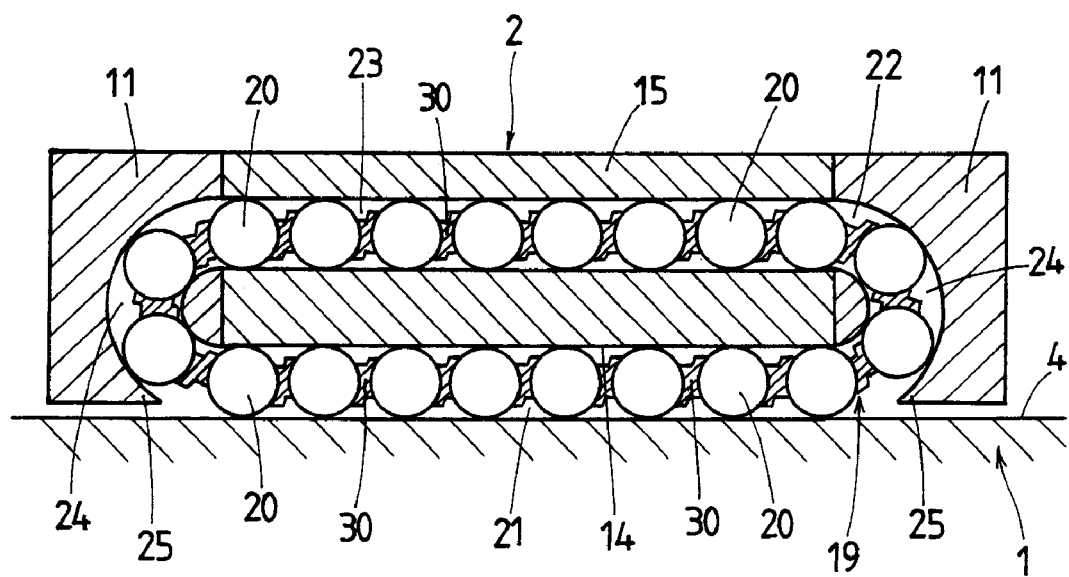
FIG. 2 is an enlarged sectional view illustrating any one of recirculating passages formed in the linear motion guide unit of FIG. 1.

Referring next to FIG. 2, there is shown a recirculating passage 19 in the linear motion guide unit. A load area 21 is defined between the first raceway groove 4 formed on the track rail 1 and the second raceway groove 14 formed on the casing 10 of the slider 2 in confronting the first raceway groove 4 on the track rail 1. On other hand, a non-loaded area 22 is composed of a return path 23 arranged in the casing 10 in parallel with the load area 21, and turnarounds 24 formed in the opposed end caps 11, each to each end cap, to connect the load area 21 to the return path 23. Thus, the circulating passage 19 consists of the load area 21 and the non-loaded area 22, which are connected to allow a string of the balls 20 and separators interposed between any two adjacent balls to recirculate through them. The balls 20 roll along the load area 21, and then come in the turnaround 24 in any one of the end caps 11. The balls 20 further run from the turnaround 24 to the return path 23 in the casing 10. It will be thus understood that the balls 20 run though the recirculating passage 19, thereby allowing the slider 2 to move smoothly with respect to the track rail 1. The end caps 11 are provided with claws 25 for scooping the balls 20 out of the load area 21 facing the track rail 1.

Figure 3:
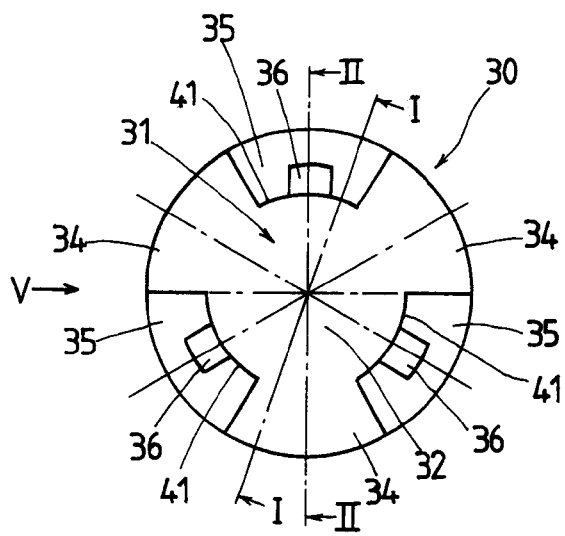
FIG. 3 is a front elevation, as seen along an arrow III of FIG. 5, of a separator to be used in the linear motion guide unit of the present invention.
Figure 4:
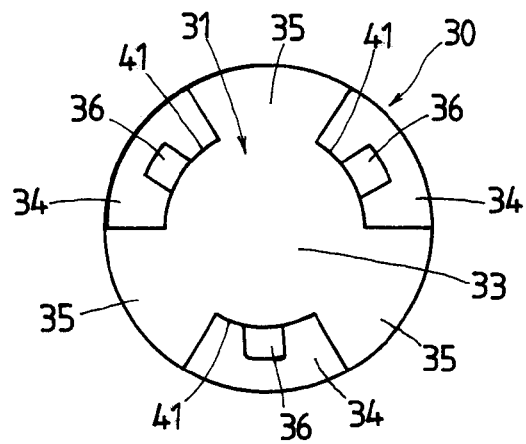
FIG. 4 is a rear elevation, as seen along another arrow IV of FIG. 5, of a separator to be used in the linear motion guide unit of the present invention.
Figure 5:
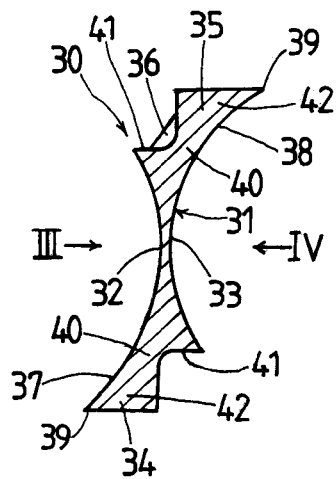
FIG. 5 is a sectional view of the separator of FIG. 3 taken along the line I—I.
Figure 6:
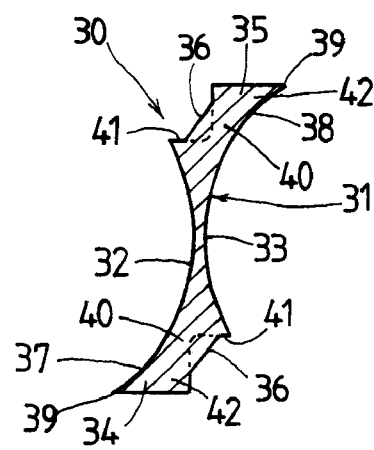
FIG. 6 is a sectional view of the separator of FIG. 3 taken along the line II—II.
Figure 9:
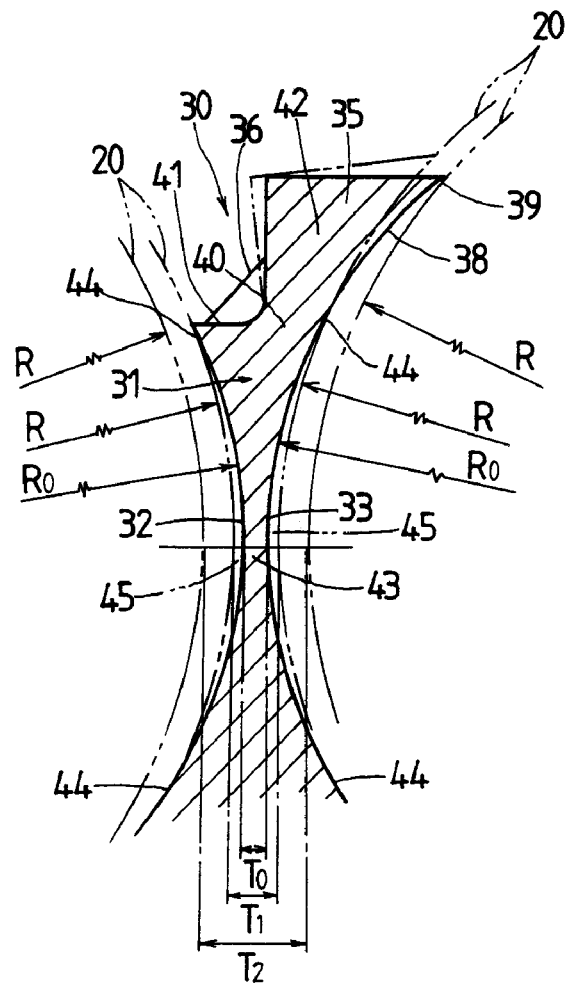
FIG. 9 is an enlarged schematic section explanatory of the contact of the separator of FIG. 5 with the associated rolling elements.

As seen from FIG. 2, the separators 30, each having thereon elastic supports, are disposed between any two adjacent balls 20 to keep the balls 20 from coming into direct contact with each other during their rolling through the recirculating passages 19. Referring to FIGS. 3 to 7, the separator 30 consists of a major body 31 designed to define the minimum distance $T_1$ spacing the two adjacent balls 20 apart from each other, and elastic supports 34, 35 positioned at preselected intervals around the periphery 41 of the major body 31. The elastic supports 34, 35 are each comprised of an elastically deformable leg 40 connected to the periphery 41 of the major body 31, and a seat 42 attached to a distal end of the elastic leg 40. The seats 42 are brought into abutment against any associated ball 20 by the elastic action of the deformable legs 40. The major body 31 is formed of a cylindrical solid having the periphery 41 that is less in the outside diameter than the ball 20. The elastically deformable legs 34, 35 are, as shown in FIGS. 5, 6 and 9, formed integrally with the periphery 41 of the major body 31, with extending radially outwardly toward either one of their associated balls 20. The elastic supports 34, 35 are inside the outside diameter of the ball 20 even at their radially outermost extremities 39. The elastic supports 34, 35 serve to keep on spacing the two adjacent balls 20 apart from each other with an interval $T_2$ beyond the minimum interval $T_1$ by virtue of the elastic action of the deformable legs 40.

Figure 8:
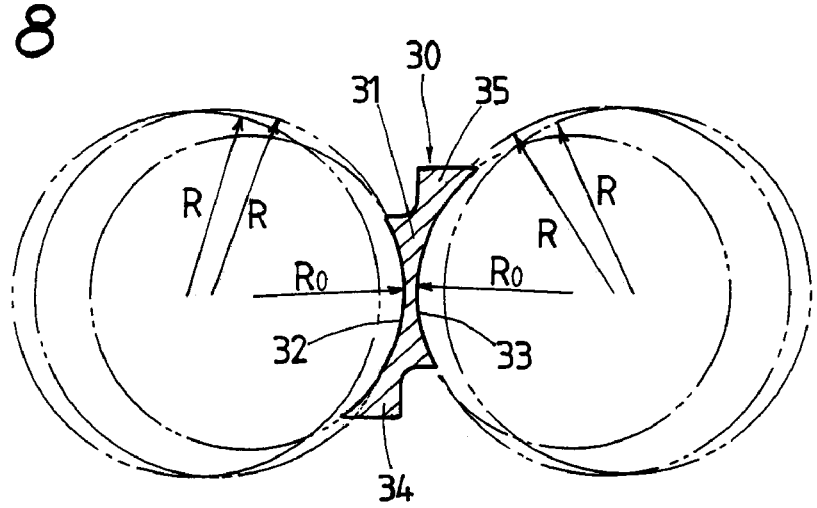
FIG. 8 is a schematic illustration explanatory of the separator interposed between any two adjacent rolling elements in the linear motion guide unit of the present invention.

The major body 31 of the separator 30, as seen from FIG. 8, has the axially opposing ends facing the ball 20, which are each recessed in the form of a semispherical surface 32, 33 that is somewhat smaller in the radius of curvature than the ball 20, or larger in curvature than the ball 20. Thus, the least thickness $T_0$ at the center of the major body 31 is made less than the minimum interval $T_1$ between the two adjacent balls 20. Even when the balls come nearest to the separator 30, the balls 20 as illustrated in FIG. 9 come into contact with the separator 30 only at the annular peripheral areas 44 of the semispherical surfaces 32, 33 rather than overall the semispherical surfaces 32, 33 on the major body 31 of the separator 30. Spaces confined between the separator 30 and the balls 20 may serve to accommodate therein lubricant such as grease and lubricating oil. With the construction described just above, the separator 30 may predominantly come into contact with either one of the annular peripheral areas 44 of the semispherical surfaces 32, 33 and the elastic supports 34, 35 under the elastic action of the deformable legs 40, depending on the different modes of load exerted on the string of balls.

Figure 7:
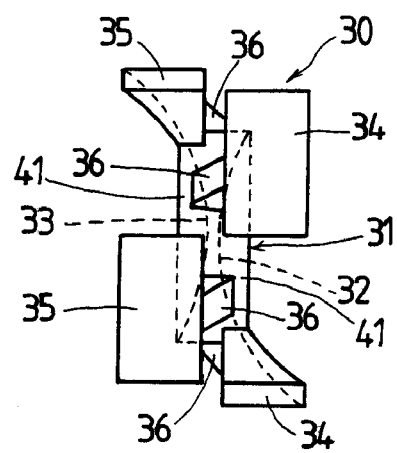
FIG. 7 is a side elevation of the separator of FIG. 3, as seen along an arrow V of FIG. 3.

The elastic supports 34, 35 of the separator 30 are arranged at preselected intervals around the major body 31 on the peripheries of the opposing ends facing the balls 20. In the embodiment illustrated here, the elastic supports 34, 35, each formed in a sector of 60°, are positioned at regular intervals, for example, at three equal intervals, around the major body 31. The elastic supports 34 on the side facing any one of the two adjacent balls 20 are, as shown in FIGS. 3, 4 and 7, arranged displaced circumferentially of the major body 31 with respect to other elastic supports 35 on the side facing another of the adjacent balls 20. That is to say, any one of the elastic support 34 distributed around the major body 31 is intermediate between any two adjacent elastic supports 35 that are also positioned at regular intervals around the major body 31. Thus, no elastic support 34, 35 is seen overlapping with any other of the elastic supports 34, 35 as viewed axially of the separator 30. The elastic supports 34, 35 intermittent around the separator 30 are much flexible to move toward and away from their associated balls 20, compared with the construction in which the elastic supports 34, 35 are formed integrally around the separator 20. Moreover, the construction in which the elastic supports 34, 35 are disposed offset from one another allows the balls 20 closest to each other to roll with no interference with one another.

The seats 42 of the elastic supports 34, 35 are provided with concaved surfaces 37, 38 that may come into contact with their associated balls 20. The concaved surfaces 37, 38 are formed into the curved surfaces that are identical with the semispherical surface 32, 33 in the radius of curvature, which is somewhat smaller than that of the ball 20, so that the concaved surfaces 37, 38 are merged in continuity with the semispherical surface 32, 33. Thus, the concaved surfaces 37, 38, as shown in FIG. 9 with solid lines, are made coincident with a phantom spherical elongation of the semispherical surfaces 32, when the deformable legs 40 are free from any stress, thus recovering from their deformation. Namely, the concaved surfaces 37, 38 of the elastic supports 34, 35, as seen from FIG. 9, merge into the semispherical surfaces 32, 38 of the major body 31, which face the balls 20, on a sphere having a radius of $R_0$.

The deformable legs 40 of the elastic supports 34, 35 are to connect the seats 42 to the major body 31 and made so slim in thickness as to flex easily to cause elastic bend for the deformable legs 40, moving the seats 42 toward and away from the associated balls 20. Since the deformable slim legs 40 undergo repeated flexing stress owing to the bending force arising from the balls 20 acting on the elastic supports 32, 35, they are liable to be made fatigued, deteriorated, thus rendered brittle. To cope with such problem, the elastic supports 34, 35 are each reinforced with a rib 36, which are formed integrally with the periphery 41 of the major body 31, as shown in FIG. 6. The ribs 36 reinforcing the elastic supports 34, 35 increases the durability of the deformable legs 40, contributing to prolonging the acceptable service life of the separators 30.

Each separator 30 keeps the two adjacent balls 20 rolling through the recirculating passage 19 from making direct contact with each other. When the force rendering the adjacent balls 20 near each other is small in magnitude, the amount of elastic deformation occurring in the deformable legs 40 is so small that the elastic supports 34, 35 made abutted against the adjacent balls 20 by the elastic action of the deformable legs 40 allow the adjacent balls 20 to stand apart from each other with the inter-ball distance $T_2$, which is wider than the minimum distance $T_1$. As the force influenced by the balls 20 becomes smaller, an area, or a second position as shown in FIG. 9, where the separator 30 comes into friction contact with the balls 20 shifts radially as far away as the outermost extremities 39 of the elastic supports 34, 35.

With the increase of load exerted on the balls 20 to make them near each other, the balls 20 move to phantom positions shown in FIG. 9 with warping backward the seats 42 against the elasticity of the deformable legs 40. Thus, the elastic supports 34, 35 of the separator 30 make displacement to their retreated positions by virtue of the elastic deformation of the legs 40. As a result, the area where the separator 30 makes contact with its associated balls 20 reaches from the second position to a first position where the annular peripheral area 44 of the major body 31 comes into contact with the associate ball 20. With this situation, the interval between the adjacent balls 20 is kept at the minimum distance $T_1$. Even if the whole of the separator 30 were made of elastic material such as rubber, the balls 20 would approach limitlessly each other depending on the magnitude of load exerted. In contrast, the major body 31 of the separator 30 exemplified here is made of synthetic resin capable of stabilizing substantially in thickness. As the balls 20 are relieved from such load as described above, the contact areas of the separator 30 with the balls 20 reverts to only the second positions. As will be seen from the above, the distance between any two adjacent balls 20 may be regulated automatically depending on the magnitude of load exerted on the balls 20 rolling through the recirculating passages. Thus, even when it is very difficult to incorporate the last one of either the separator 30 or the ball 20 into the recirculating passages because of some variance in length of the recirculating passage, it may be sufficient to only press the balls 20 and separators 30, which have been already charged in the recirculating passages, together inward to make the separators 30 elastic deformation to thereby create just enough space in the recirculating passage to accommodate the last one of either the ball 20 or the separator 30. This makes it easy to finish the linear motion guide unit and also helps ensure smooth rolling of the balls 20 through the recirculating passage.

Figure 10:
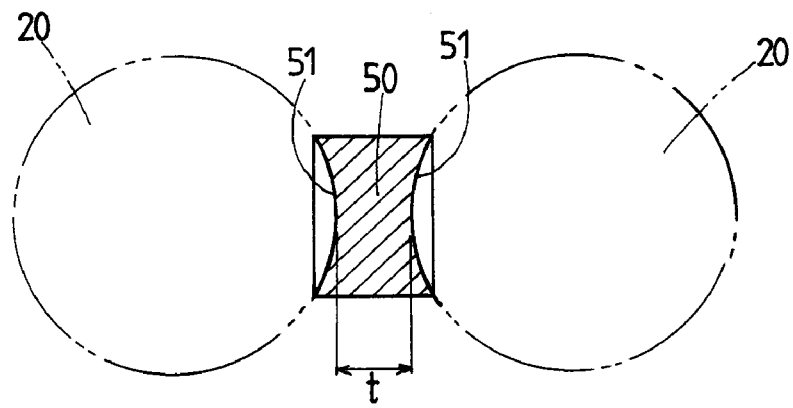
FIG. 10 is a schematic section showing a prior separator used in the conventional linear motion guide unit.

One or more separators disposed between any two adjacent balls 20 in the recirculating passage 19 has been explained hereinbefore as being all provided by the separator 30 as shown in FIG. 2. However, it will be apparently allowed to make some separators in the recirculating passage the separator 30 of this invention, and others the prior separators 50 as shown in FIG. 10. As the separator 30 according to the present invention is formed in an elastically deformable construction, only one or some separators 30 can meet the desired functional demands in the recirculating passage 19. That is to say, replacing any one or more of many prior separators 50 as shown in FIG. 10 in the recirculating passage with the separators 30 of the present invention results in easy assemblage of the linear motion guide unit, and in providing the slider 2 that may move smoothly with respect to the track rail 1. With two separators 30 of the present invention incorporated at two locations, each to each location, where the recirculating passage is divided into just two halves, any one of the separators 30 always occurs in the load area 21 under common operating condition of the linear motion guide units, where a stroke of the slider 2 is certainly over twice the length of the casing 10. This makes it possible to compensate for even minute change in the interval between the adjacent balls 20 with the result of ensuring smooth movement of the slider 2. Moreover, when all the separators in the recirculating passage 19 are replaced with the separators 30 of the present invention as shown in FIG. 2, the changes in the intervals between any two adjacent balls 20 may be compensated at every separator 20 so that the slider 2 is allowed to move far smoothly. In addition, gaps left between the adjacent elastic supports 34, 35 distributed at regular intervals around the separator 30 may serve to provide sumps or channels for lubricant, helping ensure good lubrication to increase the service life of the linear motion guide units.

What is claimed is:

1. A linear motion guide unit comprising; a track rail having first raceway grooves on lengthwise side surfaces thereof; a slider riding astride on the track rail for movement in a sliding manner along and with respect to the track rail, the slider being made with second raceway grooves confronting the raceway grooves of the track rail; recirculating passages composed of load areas defined between the confronting first and second raceway grooves, and non-loaded areas formed in the slider to communicate with the load areas; rolling elements running through the recirculating passages; and separators disposed between any two adjacent rolling elements to move together with the rolling elements through the recirculating passages; wherein at least one of the separators is comprised of a major body allowing a minimum interval for the two adjacent rolling elements, and elastic supports arranged radially extended around the major body to keep the adjacent rolling elements apart away each other with a distance larger than the minimum interval.

2. A linear motion guide unit constructed as defined in claim 1, wherein the major body of the separator is of a cylindrical solid smaller in diameter than the rolling element and having axially opposing end faces confronting the adjacent rolling elements, the end faces being each made concaved with a radius of curvature, which is somewhat less than a radius of the rolling element.

3. A linear motion guide unit constructed as defined in claim 1, wherein the elastic supports of the separator are each composed an elastically deformable leg connected to an outer periphery of the major body, and a seat attached to a radial distal end of the deformable leg to come into abutment against any one of the adjacent rolling elements under elastic influence of the deformable leg.

4. A linear motion guide unit constructed as defined in claim 3, wherein the seats on the elastic supports are each made with a concaved surface that is identical with the concaved end face of the major body in the radius of curvature.

5. A linear motion guide unit constructed as defined in claim 4, wherein the concaved surface of the seat is made coincident with a phantom curved elongation of the concaved end face of the major body when the associated deformable leg is free from any stress, thus recovering from their deformation.

6. A linear motion guide unit constructed as defined in claim 3, wherein the elastically deformable legs of the elastic supports are each made of a portion slim in thickness, which connects the associated seat to the major body.

7. A linear motion guide unit constructed as defined in claim 1, wherein the elastic supports of the separator are positioned at desired intervals around peripheries of the axially opposing end faces of the major body.

8. A linear motion guide unit constructed as defined in claim 7, wherein the elastic supports on the side facing any one of the two adjacent balls are arranged offset circumferentially of the major body with respect to other elastic supports on the side facing another of the adjacent balls.

9. A linear motion guide unit constructed as defined in claim 1, wherein the elastic supports of the separator are each reinforced with a rib formed integrally with the major body.

10. A linear motion guide unit constructed as defined in claim 1, wherein the separators each comprised of the major body and the elastic supports are disposed everywhere between any adjacent rolling elements in the recirculating passage.

11. A linear motion guide unit constructed as defined in claim 1, wherein the separators each comprised of the major body and the elastic supports are disposed between the two adjacent rolling elements at only two locations, each to each location, where the recirculating passage is divided into just two halves.

12. A linear motion guide unit constructed as defined in claim 1, wherein the slider is comprised of a casing and end caps attached to lengthwise opposing ends of the casing, each to each end, the casing being made with the second raceway grooves and also having therein return passages to provide a part of non-loaded areas where the rolling elements is less subjected to load, and the end caps being made therein with turnarounds to provide other part of the non-loaded areas, communicating the load areas with the return passages to allow the rolling elements turning round in a recirculating manner.

* * * * *